T. R. McKNIGHT & J. M. BAILEY.
BEET HARVESTING MACHINE.
APPLICATION FILED OCT. 13, 1917.
1,295,340.
Patented Feb. 25, 1919.
3 SHEETS—SHEET 1.
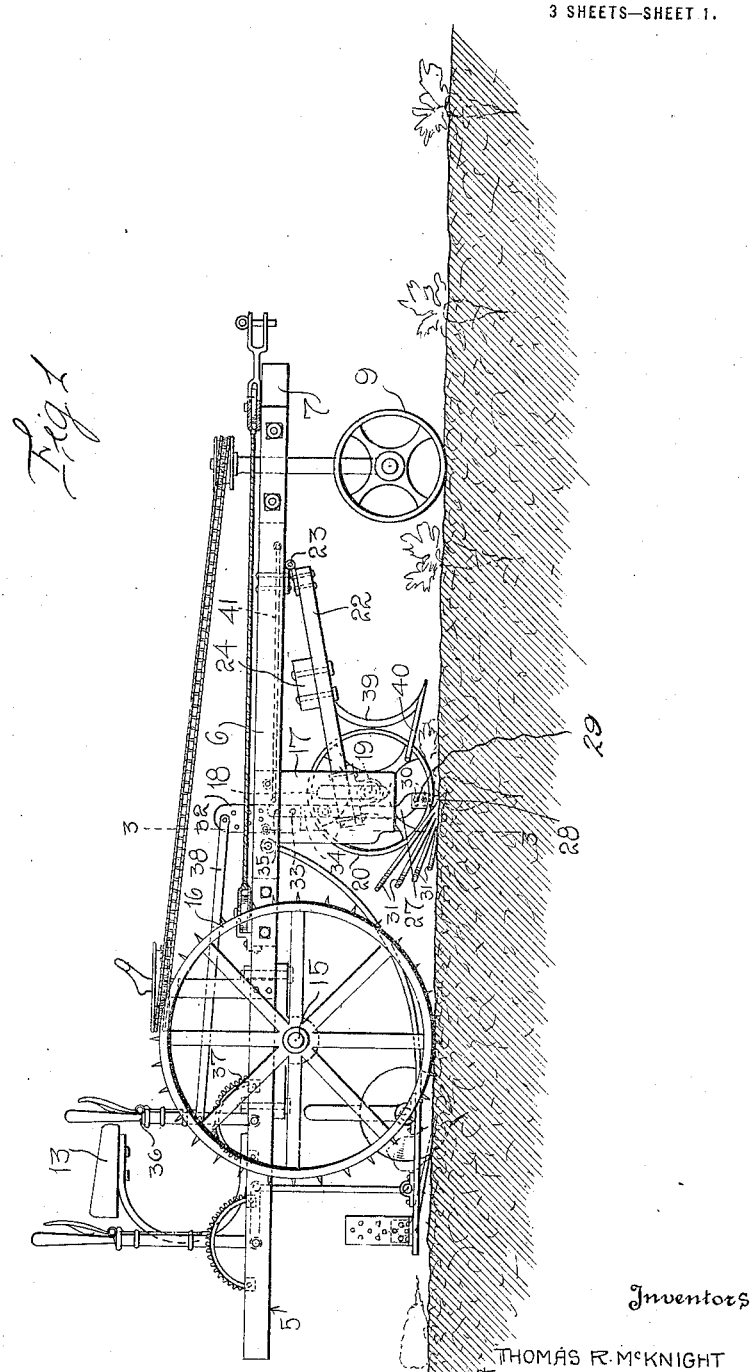

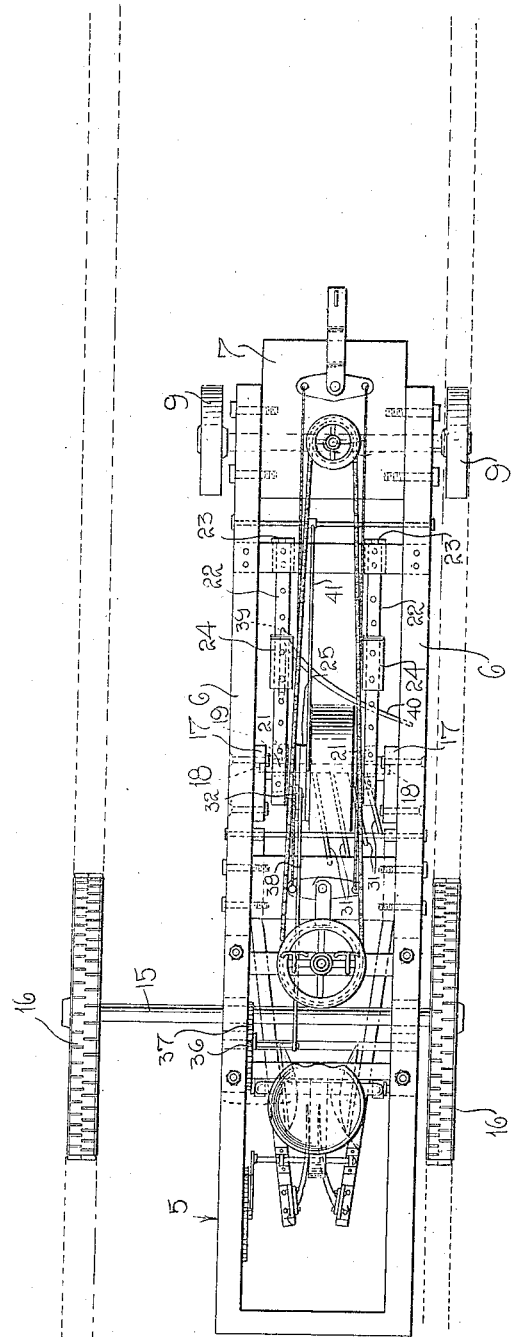

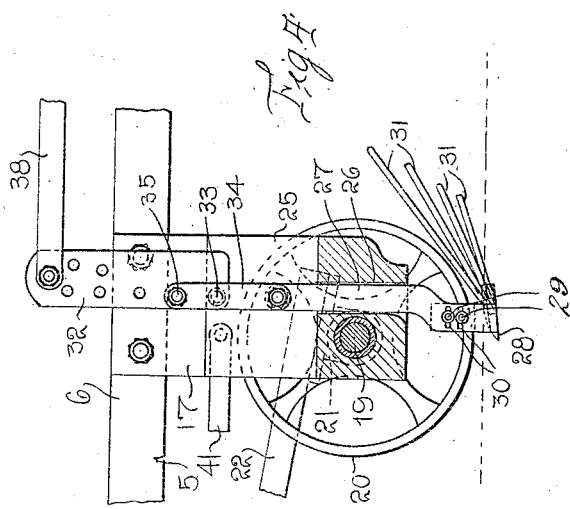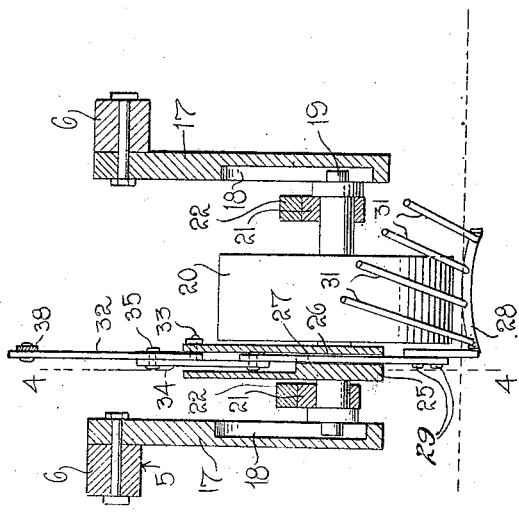

UNITED STATES PATENT OFFICE.

THOMAS R. McKNIGHT, OF PHIPPSBURG, AND JAMES M. BAILEY, OF OAK CREEK, COLORADO.

BEET-HARVESTING MACHINE.

1,295,340.  Specification of Letters Patent.  Patented Feb. 25, 1919.

Application filed October 13, 1917. Serial No. 196,538.

*To all whom it may concern:*

Be it known that we, THOMAS R. MCKNIGHT and JAMES M. BAILEY, citizens of the United States, residing at Phippsburg and Oak Creek, respectively, in the county of Routt and State of Colorado, have invented certain new and useful Improvements in Beet-Harvesting Machines, of which the following is a specification, reference being had to the accompanying drawings.

This invention relates to beet harvesting machines, and has for its primary object to provide simple and positively operating mechanism for severing or cutting the tops from the beets close to the ground.

It is another and more particular object of the invention to provide a gravity movable wheel mounted upon the machine frame and adapted to depress the beet tops and hold the same closely upon the ground surface at the moment of engagement of the cutting knife with the beet stalks, and means for vertically adjusting the cutting knives.

And it is a further general object of our invention to materially improve and simplify machines for the harvesting of beets, in the particulars above referred to, whereby a machine of relatively light draft and one which may be manufactured at comparatively small cost is produced.

With the above and other objects in view, our invention consists in the novel features of construction, combination, and arrangement of parts to be hereinafter more fully described, claimed and illustrated in the accompanying drawing, in which, Figure 1 is a side elevation illustrating the preferred embodiment of our invention;

Fig. 2 is a top plan view;

Fig. 3 is a section taken on the line 3—3 of Fig. 1;

Fig. 4 is a section taken on the line 4—4 of Fig. 3.

Referring in detail to the drawing, 5 designates a frame which may be of any suitable form and dimensions, but as shown, this frame is of elongated rectangular form and includes spaced parallel side bars 6, between the forward ends of which a platform 7 is securely bolted. This frame is supported at its forward end by the guide wheels 9. Upon the rear end of the frame a suitable operator seat 13 is mounted.

The frame 5 in spaced relation to its rear end is supported upon an axle 15, and on the opposite ends of this axle, the ground wheels 16 are revolubly mounted. It is to be noted that one of the ground wheels is disposed closely contiguous to one side of the frame, while the other ground wheel is spaced an appreciable distance from the opposite side of the frame, so that said latter ground wheel will travel in the space between the two rows of beets adjacent to the beet row which is being harvested, as will be seen with reference to Fig. 2 of the drawings.

To the inner sides of the longitudinal bars 6 of the frame, and in advance of the ground wheel 16, the hangers 17 are securely bolted at their upper ends. Each of these hangers is provided in its inner face with a vertical guide channel 18 to receive the respective ends of a shaft or axle 19, upon which a wheel 20 is fixed. This axle is journaled in bearings, indicated at 21 on the spaced bars 22. These bars at their forward ends are hingedly connected to the machine frame, as at 23, and on each bar a longitudinally adjustable weight block 24 is mounted.

A vertically disposed guide standard 25 is also mounted on the shaft 19 at one side of the wheel 20 and this standard is provided with a vertical opening 26 through which the rectangular bar or shank 27 is freely movable. The lower end of this bar is offset in a forward direction and to the same one end of a topping knife 28 is adjustably bolted, by means of the bolts indicated at 29 extending through the slots 30 in said bars.

In the operation of the machine, the cutting edge of the knife 28 is disposed substantially in vertical alinement with the axis of the wheel 20. A plurality of obliquely disposed tines 31 are fixed at one of their ends to the topping knife and extend rearwardly therefrom to direct the severed beet tops and deposit the same upon the ground out of the path of the beet uprooting disks.

Upon the upper end of the standard 25, an arm 32 is pivotally mounted as at 33 and to this arm, in spaced relation to its pivot, one end of a link 34 is pivotally connected, as shown at 35, the other end of said link being pivotally connected to the upper end of the bar 27. An adjusting lever 36 is mounted upon the machine frame in convenient relation to the driver's seat and carries the usual spring pressed dog for engagement with the teeth of a quadrant 37 fixed on the frame. A rod 38 is connected at its rear end to this lever, the forward end of said rod being pivotally connected to the upper end of the arm 32.

Upon one of the bars 22, in advance of the wheel 20, the end of a rod 39 is secured, said rod extending downwardly and having an obliquely disposed, transversely extending deflecting arm 40, which is adapted to engage the foliage or tops of the beets and deflect the same toward the righthand side of the wheel 20, so that said wheel urged downwardly by the weights 24 will bear directly upon the beet stalks.

In order to brace the standard 25 and sustain the same in an upright position on the shaft 19, a forwardly extending rod 41 is fixed to the upper end of this standard and has its forward end suitably fixed to the frame 5.

The operation of the beet topping mechanism of the machine will be readily understood from the above description. The topping knife 28 is properly adjusted to engage the stalks at any desired point relative to the surface of the ground by the manipulation of the lever 36, which, through the rod connection 38, arm 32, and link 34, moves the knife carrying bar 27 vertically through the standard 25. Thus, as shown in Fig. 4, the knife is in its highest position and when the lever 36 is moved in one direction and the arm 32 swung upon its pivot, the link 34 will move downwardly and out of alinement with said arm and the bar 27, so that the latter may move downwardly through the guide standard, thus lowering the knife bar to the desired extent. As shown, the arm 32 may be provided with a number of openings for the adjustable connection of the link pivot 35 to said arm. In the movement of the machine, the deflecting arm 40 directs the beet foliage toward the right, as above explained, and the gravity movable wheel 20 holds the foliage and beet stalks closely upon the ground surface, exerting sufficient pressure thereon, so that the knife bar 28 will cut through all of the beet stalks, thereby cleanly removing the foliage from the beet. The pressure of the wheel 20 upon the beet stalks may be varied or regulated by the proper adjustment of the weights 24 toward or from the hinged ends of the bars 22.

From the foregoing description, taken in connection with the accompanying drawings, the construction, manner of operation and several advantages of the various parts of our improved beet harvesting machine will be clearly understood. By means of our invention, beets may be quickly harvested and much of the labor heretofore incident to the harvesting and topping of the beets obviated. The topping mechanism, while very simple in its construction, is positive and reliable in practical operation and provides means whereby the beet tops will be completely and cleanly cut or severed prior to the extrusion of the beets. As the various elements above referred to are of relatively simple construction, it will be appreciated that the machine is not liable to get out of order or require frequent repair. It is also capable of manufacture at comparatively small cost, and being light in weight, will be very durable in practical use.

While we have herein shown and described the preferred construction and arrangement of the several parts, it is, of course, manifest that the same are susceptible of considerable modification, and we, therefore, reserve the privilege of adopting all such legitimate changes as may be fairly embodied within the spirit and scope of the invention as claimed.

Having thus fully described our invention, what we claim and desire to secure by Letters Patent is:—

1. In a beet harvesting machine, a wheel supported frame, a pair of bars depending from said frame and having guide channels in their inner faces, spaced bars hingedly mounted at one of their ends upon the frame, a shaft supported in the other ends of said bars and engaged at its ends in said guide channels, a beet top depressing wheel mounted upon said shaft, and a beet topping knife extending transversely below said wheel and having a cutting edge located substantially in line with the axis of said wheel.

2. In a beet harvesting machine, a wheel supported frame, spaced bars hingedly mounted at one of their ends upon the frame, a shaft supported in the other ends of said bars, guides depending from the frame and in which the ends of said shaft are mounted, a beet top depressing wheel on the shaft, a beet topping knife, a standard mounted upon the shaft, a shank vertically movable on the standard and fixed at one of its ends to the knife, an arm pivoted upon the standard, a link connecting said arm to said shank, and actuating means for said arm whereby the topping knife may be vertically adjusted relative to said wheel.

3. In a beet harvesting machine, a wheel supported frame, spaced bars hingedly mounted at one of their ends upon the frame, guide means for the other ends of said bars depending from the frame, a beet top depressing wheel mounted upon the latter ends of the bars, weights longitudinally adjustable upon the bars, a deflecting member fixed to one of said bars in advance of the wheel to engage and deflect the beet stalks whereby said stalks are engaged and depressed upon the ground surface by the wheel, and a beet topping knife extending transversely below said wheel having its cutting edge located substantially in line with the axis of said wheel.

4. In a beet harvesting machine, a wheel supported frame, spaced bars hingedly mounted at one of their ends upon the frame, guide means for the other ends of said bars depending from the frame, a beet top depressing wheel mounted upon the latter ends of the bars, weights longitudinally adjustable upon the bars, a beet topping knife extending transversely below said wheel having its cutting edge located substantially in line with the axis of said wheel, and means mounted in the frame and operatively connected to the topping knife for vertically adjusting said knife relative to the wheel.

In testimony whereof we hereunto affix our signatures in the presence of two witnesses.

THOMAS R. McKNIGHT.
JAMES M. BAILEY.

Witnesses:
ALLEN CLIFF,
E. B. PARKER.

Copies of this patent may be obtained for five cents each, by addressing the "Commissioner of Patents, Washington, D. C."